(Model.)

B. S. PORTER.
TWO WHEELED VEHICLE.

No. 286,483. Patented Oct. 9, 1883.

WITNESSES:

INVENTOR:
B. S. Porter
BY Munn & Co.
ATTORNEYS.

UNITED STATES PATENT OFFICE.

BENJAMIN S. PORTER, OF RED OAK, IOWA, ASSIGNOR TO HIMSELF AND DAVID B. MILLER, OF SAME PLACE.

TWO-WHEELED VEHICLE.

SPECIFICATION forming part of Letters Patent No. 286,483, dated October 9, 1883.

Application filed July 13, 1883. (Model.)

*To all whom it may concern:*

Be it known that I, BENJAMIN S. PORTER, of Red Oak, in the county of Montgomery and State of Iowa, have invented a new and Improved Two-Wheeled Vehicle, of which the following is a full, clear, and exact description.

My invention consists, first, of the employment of equalizing-bars so arranged that the body of the vehicle will always maintain a level position without reference to the locality of the load in the body or the amount of the load.

The invention also consists in the use of horizontally-arranged Y-shaped springs, the upper and lower members of the springs being attached, respectively, to the body and axle of the vehicle, the trunks of the springs being attached to the thills, or to a front cross-bar or other relatively fixed part of the vehicle.

The invention also consists of the construction, arrangement, and combination of parts, all as hereinafter described and claimed.

Reference is to be had to the accompanying drawings, forming a part of this specification, in which similar letters of reference indicate corresponding parts in both the figures.

Figure 1:
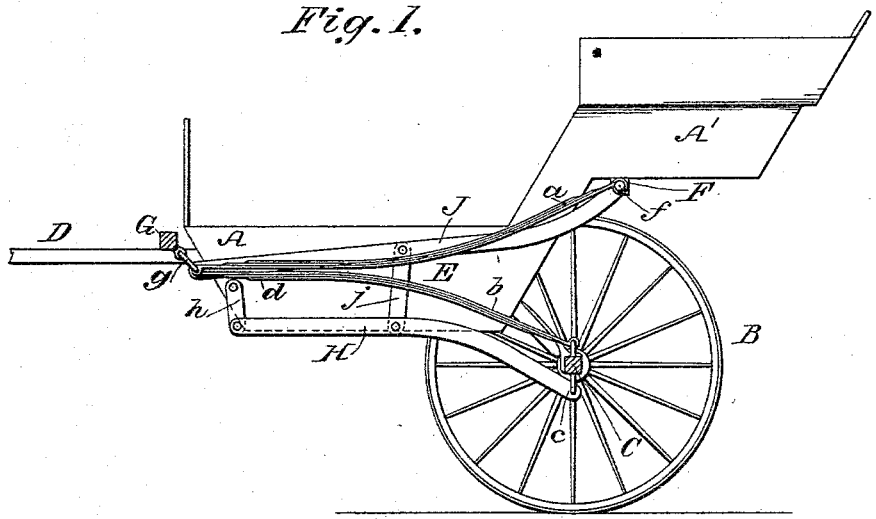
Figure 2:
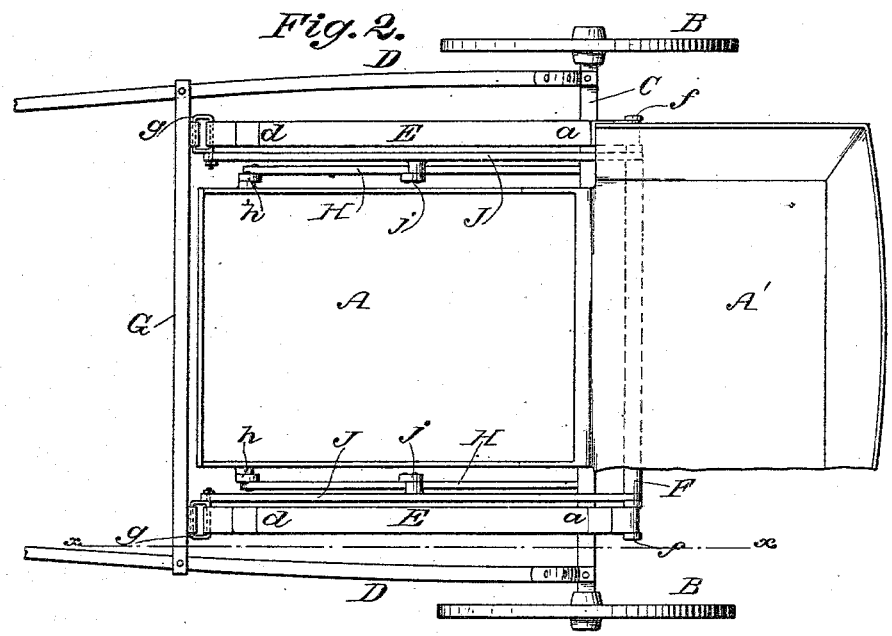

Figure 1 is a sectional side elevation of my new and improved two-wheeled vehicle, taken on the line $x\ x$ of Fig. 2; and Fig. 2 is a plan view of the same with the seat partly broken away.

The body A, seat A', wheels B B, axle C, and thills D D of the vehicle may be of any approved form and construction.

E E represent the springs. These are Y-shaped, and are arranged at the sides of the body A. The upper portions or members, $a\ a$, of the springs are attached to the wrists $f\ f$, formed at the ends of the cross-bar F, on which the seat portion A' of the body rests, while the lower members, $b\ b$, of the springs rest upon and are attached to the axle C. The forward portions or trunks, $d\ d$, of the springs E E are attached by means of the shackles $g\ g$ to the cross-bar G, secured upon the thills D D in front of the body A. The upper members, $a\ a$, of the springs E E are a trifle longer than the lower members, $b\ b$, so that the cross-bar F is held a little in rear of the axle C, thus bringing the point of support of the rear part of the body A back of the axle, as shown.

The forward part of the body A is attached by the links $h\ h$ to the forward ends of the lower equalizing-bars, H H, the rear ends of which are attached by means of the shackles or loops $c\ c$ to the axle C.

J J are the upper equalizing-bars. These are attached at their forward ends to the shackles $g\ g$ and at their rear ends to the cross-piece F, and are connected in the center to the centers of the lower equalizing-bars, H H, by the connecting-rods $j\ j$.

By this arrangement it will be seen that in case the greater part of the load comes upon the seat A' the upper equalizing-bars, J J, acting through links $j\ j$, bars H H, and links $h\ h$, will draw downward the forward end of the body A, and that in case the greater part of the load should come upon the forward part of the body, the lower equalizing-bars, H H, acting through the links $h$ and $j$, will in turn draw downward the rear end of the body A, so that no matter where the greater part of the load may happen to be located in the body, the level of the body will always be maintained.

By the use of the Y-shaped springs the vehicle is made very elastic and easy riding.

I do not abandon or dedicate to the public any patentable features set forth herein and not hereinafter claimed, but reserve the right to claim the same either in a reissue of any patent granted upon this application or in other applications for Letters Patent that I may make.

Having thus described my invention, I claim as new and desire to secure by Letters Patent—

1. In a two-wheeled vehicle, the equalizing-bars H J, linked together and attached to the body, thills, and axle, and arranged to operate substantially as described.

2. In a two-wheeled vehicle, the Y-shaped springs E E, attached to the body, axle, and thills, and arranged to operate substantially as described.

3. The lower equalizing-bars, H, attached at their rear ends to the axle and at their forward ends to the body A by means of the links $h$, in combination with the upper equalizing-bars, J, attached at their forward ends to the thills D or cross-piece G and at their rear ends to the cross-piece F, and linked to the lower equalizing-bars by the links $j$, substantially as and for the purposes set forth.

BENJAMIN S. PORTER.

Witnesses:
JOSIAH O. CURTIS,
BAXTER W. EDWARDS.